(12) United States Patent  
Riederer et al.

(10) Patent No.: US 10,589,596 B2  
(45) Date of Patent: Mar. 17, 2020

(54) THERMAL MANAGEMENT FOR AN ELECTRIC OR HYBRID VEHICLE AND A METHOD FOR AIR-CONDITIONING THE INTERIOR OF SUCH A MOTOR VEHICLE

(71) Applicants: Gentherm GmbH, Odelzhausen (DE); Bayerische Motoren Werke AG, Munich (DE); Technische Universitaet Muenchen, Munich (DE)

(72) Inventors: Stefan Riederer, Riedering (DE); Leonhard Hoerth, Munich (DE); Heinrich Birndorfer, Muensingen (DE); Marco Ranalli, Augsburg (DE); Martin Adldinger, Holzheim (DE); Manuel Lorenz, Tutzing (DE)

(73) Assignees: Gentherm GmbH, Odelzhausen (DE); Bayerische Motoren Werke, Munich (DE); Technische Universitaet Muenchen, Munich (DE)

( * ) Notice: Subject to any disclaimer, the term of this patent is extended or adjusted under 35 U.S.C. 154(b) by 205 days.

(21) Appl. No.: 15/187,220

(22) Filed: Jun. 20, 2016

(65) Prior Publication Data

US 2016/0297280 A1     Oct. 13, 2016

Related U.S. Application Data

(63) Continuation of application No. PCT/EP2014/078777, filed on Dec. 19, 2014.

(30) Foreign Application Priority Data

Dec. 20, 2013   (DE) ..................... 10 2013 227 034

(51) Int. Cl.  
    *B60H 1/00*     (2006.01)  
    *F25B 21/02*    (2006.01)  
    *F25B 21/04*    (2006.01)

(52) U.S. Cl.  
    CPC ..... *B60H 1/00478* (2013.01); *B60H 1/00278* (2013.01); *B60H 1/00385* (2013.01);  
    (Continued)

(58) Field of Classification Search  
    CPC ............ B60H 1/00271; B60H 1/00278; B60H 1/00285; B60H 1/00328; B60H 1/00385;  
    (Continued)

(56) References Cited

U.S. PATENT DOCUMENTS

| | | |
|---|---|---|
| 5,117,638 A | 6/1992 | Feher |
| 5,624,003 A | 4/1997 | Matsuki et al. |

(Continued)

FOREIGN PATENT DOCUMENTS

| | | |
|---|---|---|
| DE | 26 38 862 A1 | 3/1978 |
| DE | 10 2005 022 656 A1 | 3/2006 |

(Continued)

*Primary Examiner* — Cassey D Bauer  
*Assistant Examiner* — Miguel A Diaz  
(74) *Attorney, Agent, or Firm* — Muncy, Geissler, Olds & Lowe, P.C.

(57) ABSTRACT

An energy-efficient thermal management system for an electric or hybrid vehicle is provided. The system has a first coolant circuit for controlling the temperature of electric components of an electric powertrain, an air-conditioning unit being provided for air-conditioning an interior. A second coolant circuit air-conditions the interior and is operable independently of the first coolant circuit. Each coolant circuit comprises a pump and a respective ambient heat exchanger. In order to control the temperature of the interior, a temperature control device which can be designed as a Peltier module is integrated into the second coolant circuit, said temperature control device operating in the manner of a heat pump for heating purposes. The two coolant circuits can be coupled to each other in order to exchange heat. An additional temperature control device can be integrated in (Continued)

order to air-condition an interior component in a decentralized manner, in particular a seat.

12 Claims, 3 Drawing Sheets

(52) U.S. Cl.
CPC .............. *F25B 21/02* (2013.01); *F25B 21/04* (2013.01); *B60H 2001/00307* (2013.01); *F25B 2700/21153* (2013.01)

(58) Field of Classification Search
CPC ............ B60H 1/00478; B60H 1/00885; B60H 2001/00307; B60H 2001/00928; B60H 1/00392; B60H 2001/003; F25B 21/02; F25B 21/04; F25B 2700/21153; F25B 7/00; F25B 25/005; F25B 2600/25; F25B 2600/2501; F25B 2600/2507; B60L 2240/545; H01M 10/625
See application file for complete search history.

(56) References Cited

U.S. PATENT DOCUMENTS

| | | | |
|---|---|---|---|
| 6,464,027 B1* | 10/2002 | Dage | B60H 1/004 123/41.14 |
| 7,380,586 B2 | 6/2008 | Gawthrop | |
| 7,779,639 B2* | 8/2010 | Goenka | B60H 1/004 136/204 |
| 8,631,659 B2* | 1/2014 | Goenka | B60H 1/004 62/244 |
| 8,689,741 B2 | 4/2014 | Park et al. | |
| 8,769,977 B2 | 7/2014 | Renner et al. | |
| 9,233,593 B2 | 1/2016 | Beschieru et al. | |
| 9,650,940 B2* | 5/2017 | Kakehashi | B60H 1/00885 |
| 2005/0061798 A1* | 3/2005 | Uhl | B60H 1/2218 219/494 |
| 2007/0080237 A1* | 4/2007 | Burk | B60H 1/20 237/28 |
| 2008/0028768 A1* | 2/2008 | Goenka | B60H 1/004 62/3.2 |
| 2009/0000778 A1 | 1/2009 | Nathan et al. | |
| 2010/0287952 A1* | 11/2010 | Goenka | B60H 1/00478 62/3.1 |
| 2011/0296855 A1* | 12/2011 | Johnston | B60L 3/0046 62/79 |
| 2012/0079837 A1 | 4/2012 | Maranville et al. | |
| 2012/0174602 A1* | 7/2012 | Olivier | B60H 1/004 62/79 |
| 2012/0210746 A1 | 8/2012 | Kadle et al. | |
| 2012/0247716 A1* | 10/2012 | Galtz | B60H 1/00278 165/42 |
| 2015/0380785 A1* | 12/2015 | Takeuchi | H01M 10/663 429/62 |
| 2016/0031288 A1* | 2/2016 | Nishikawa | F01P 3/20 165/202 |
| 2016/0107505 A1* | 4/2016 | Johnston | B60H 1/00385 165/202 |
| 2016/0153343 A1* | 6/2016 | Kakehashi | B60H 1/00885 123/41.31 |
| 2016/0332505 A1* | 11/2016 | Yamanaka | B60L 11/18 |
| 2017/0106724 A1* | 4/2017 | Porras | H01M 10/6568 |
| 2017/0197488 A1* | 7/2017 | Kim | H01M 10/625 |
| 2017/0227263 A1* | 8/2017 | Kopko | F25B 25/005 |
| 2017/0326945 A1* | 11/2017 | Hatakeyama | B60H 1/00807 |
| 2017/0361677 A1* | 12/2017 | Kim | B60H 1/00278 |
| 2018/0117990 A1* | 5/2018 | Kim | B60H 1/00278 |
| 2018/0178615 A1* | 6/2018 | Xia | B60H 1/00271 |
| 2018/0304739 A1* | 10/2018 | Eberspach | B60L 58/24 |
| 2018/0319246 A1* | 11/2018 | Allgaeuer | B60H 1/00278 |

FOREIGN PATENT DOCUMENTS

| | | |
|---|---|---|
| DE | 10 2008 020 366 A1 | 1/2009 |
| DE | 10 2009 039 681 A1 | 3/2011 |
| DE | 10 2010 059 237 A1 | 6/2011 |
| DE | 10 2010 021 901 A1 | 12/2011 |
| DE | 10 2010 043 576 A1 | 3/2012 |
| DE | 10 2010 048 853 A1 | 4/2012 |
| WO | WO-0130606 A1 * 5/2001 | ......... B60H 1/00285 |
| WO | WO 2011/029538 A1 | 3/2011 |
| WO | WO 2013/045089 A1 | 4/2013 |
| WO | WO-2013045089 A1 * 4/2013 | ......... B60H 1/00278 |

* cited by examiner

THERMAL MANAGEMENT FOR AN ELECTRIC OR HYBRID VEHICLE AND A METHOD FOR AIR-CONDITIONING THE INTERIOR OF SUCH A MOTOR VEHICLE

This nonprovisional application is a continuation of International Application No. PCT/EP2014/078777, which was filed on Dec. 19, 2014, and which claims priority to German Patent Application No. 10 2013 227 034.8, which was filed in Germany on Dec. 20, 2013, and which are both herein incorporated by reference.

BACKGROUND OF THE INVENTION

Field of the Invention

The invention relates to a thermal management system for an electric or hybrid vehicle. The invention further relates to a method for air-conditioning the interior of a motor vehicle with such a thermal management system.

Description of the Background Art

Such a thermal management system is disclosed for example in WO 2011/029538 A1.

For electric or hybrid vehicles in general, the problem is that compared to conventional internal combustion engines, only little waste heat of the combustion or electric drive is available to be used for other purposes, in particular for heating the passenger compartment. Drawing on the electrical energy available for heating or cooling purposes regularly reduces the possible range in electric operation. Therefore, energy-efficient thermal management systems are desired for electric or hybrid vehicles in which energy-efficient heating or cooling of the passenger compartment is ensured.

To allow for the most effective heating of the passenger compartment, even at low outside temperatures, heat pumps are often used, based on a refrigerant circuit with an integrated compressor. By means of such heat pumps, generally heat from a heat reservoir, in particular from the surrounding area, is raised to a higher temperature level per the heat pump principle and supplied to the interior.

WO 2011/029538 A1 describes the use of waste heat from the electric powertrain in addition to the utilization of ambient heat. The waste heat is thereby fed to an evaporator of the refrigerant circuit of the heat pump.

DE 10 2010 043 576 A1 furthermore discloses a thermal management system in which in a conventional manner a heater core for heating the interior is integrated in a coolant circuit for cooling the engine. In addition, the waste heat of the electric powertrain can be introduced via an additional heat exchanger in the coolant circuit of the internal combustion engine.

DE 10 2008 020 366 A1 further discloses an interior air-conditioning system in which a conventional compressor air-conditioning unit with a refrigerant circuit is used as a primary cooling source. Moreover, a Peltier device is used as a secondary cooling source, which is integrated for example in a seat for seat cooling. In this case, it is provided to circulate air through the seat, which is cooled by the Peltier device.

DE 10 2010 021 901 A1 discloses a special design of such a Peltier device, in which several thermoelectric Peltier modules are traversed in a meandering fashion by a fluid.

SUMMARY OF THE INVENTION

Proceeding from this, the present invention seeks to provide an energy-efficient thermal management system especially for electric and hybrid vehicles.

The thermal management system comprises a first coolant circuit, in which a liquid coolant for controlling the temperature of electrical components of an electrical powertrain is tempered and in particular cooled. Optionally or in combination, these components are an electric powertrain for the traction drive of the vehicle, or possibly a battery for this drive or power electronics for controlling the powertrain. In this first coolant circuit, a pump and an ambient heat exchanger for discharging excess heat into the environment are integrated. Furthermore, the thermal management system includes an air-conditioning unit for air-conditioning an interior of a motor vehicle, in particular the passenger compartment. The air-conditioning unit is commonly referred to as an HVAC unit ("Heating Ventilation Air Conditioning") or also referred to as an air conditioner. This air-conditioning unit is used, depending on current requirements, either for heating or for cooling the interior and preferably additionally also for dehumidifying indoor air. This air-conditioning unit is in particular a structural unit integrated in a housing, which is suitably connected to air ducts for interior ventilation and is provided with a fan.

Furthermore, this air-conditioning unit includes at least one heat exchanger for releasing heat into or for receiving heat from a supply air stream which flows through the air-conditioning unit. The thermal management system further comprises a second coolant circuit for a liquid coolant for the air-conditioning of the interior. The second coolant circuit is designed for a lower (maximum) operating temperature than the first coolant circuit and serves either for heating or for cooling of the interior. It is operable independent of the first coolant circuit, thus, has a further pump for the circulation of the liquid coolant and is also connected to an ambient heat exchanger so that the coolant circulating in the second coolant circuit can be guided through the ambient heat exchanger for purposes of heat exchange. Depending on the operating situation, the ambient heat exchanger serves for recooling the coolant in the second coolant circuit in the case of a cooling operation or for receiving heat from the surrounding area in the case of a heating operation. A temperature control device is further integrated in the second refrigerant circuit, in particular as part of the air-conditioning unit to control the temperature of the interior, which operates for temperature control, in particular for heating in the manner of a heat pump. When heating, therefore, the temperature control device receives heat from a heat source, such as from the environment via the ambient heat exchanger, and raises the temperature to a higher temperature per the heat pump principle. Lastly, the two coolant circuits can be coupled with each other for purposes of mutual heat exchange. In particular, the coupling serves to exchange heat from the first coolant circuit to the second coolant circuit.

Hereinafter, the first coolant circuit can also be referred to as a high-temperature coolant circuit (HT coolant circuit) and the second coolant circuit as a low-temperature coolant circuit (NT coolant circuit). During normal operation, the two coolant circuits have different temperature levels. Normal operation is hereby understood to be a warm driving state. In normal electric driving operation, the HT coolant circuit typically reaches a maximum operating temperature between 70° to 90° C. By contrast, usually no hot vehicle components to be cooled are arranged in the second coolant circuit. The maximum operating temperature of the coolant in the second coolant circuit is typically within the range of 40° C. to 50° C. Thus, in the thermal management system described herein and in addition to a conventional coolant circuit for cooling the electric powertrain, a further coolant circuit with a lower maximum temperature level which can be coupled with said conventional coolant circuit is arranged. Heat is introduced in this NT coolant circuit in the cooling mode, i.e., when the interior is to be cooled. In a heating mode, when the interior is to be heated, heat is transferred from the NT coolant circuit to the interior. The heat exchange hereby takes place via the air-conditioning unit. This additional, separate formation of an NT coolant circuit allows for improved energy-efficient use of the different power and heat sources available in the vehicle.

Conveniently, the temperature control device is a thermomagnetic and in particular, thermoelectric, module. Thus, the temperature control of the interior takes place via an electrical or electromagnetic effect. In both cases, a reversibly operating electrical or electromagnetic effect is used to selectively cool or heat the interior. The thermoelectric module is preferably configured as a Peltier module, as it is known per se. This includes a plurality of mutually interconnected Peltier elements. By applying an electric voltage, a temperature difference between two opposite sides of the module, namely, the hot side and the cold side, is produced in this Peltier module. Similarly, a cooling or also a heating power is generated in a thermomagnetic module by reversible magnetization/demagnetization of a suitable material. The effect here is based on the magnetocaloric effect, which is also generally known. The particular advantage is the fact that the module is integrated into the NT coolant circuit. The module is at least partially in a heat-exchanging connection with the coolant and is, for example, traversed or met by the flow. One of the sides of the module—also referred to as the water side—is therefore in heat-exchanging contact with the second coolant. The other side of the module—also referred to as the air side—normally has a stream of air flowing around it to control the temperature of the interior. Depending on the mode of operation—that is, whether it is a cooling mode or a heating mode—the water side can be the hot side or the cold side.

Since the efficiency and effectiveness, for example, of a Peltier module largely depends on the temperature difference between the hot and cold side, the efficiency of the Peltier module is considerably increased by this measure of controlled heat exchange with the coolant. By means of this measure, the Peltier module or the thermomagnetic module operates in the heating mode in the manner of a heat pump. In this case, the cold side is heated to keep the temperature difference between the hot and cold side to a minimum to obtain as high a yield as possible of the electrical energy used. The cold side is merely approximated to the temperature level of the hot side, but remains colder than the hot side. Overall, the integration of the Peltier module or the thermomagnetic module enhances the utilization of the electrical energy being used.

Basically it is possible to form the temperature control device as part of a, for example, compressor-driven refrigerant circuit. In this case, a heat exchanger (evaporator/condenser) of said refrigerant circuit is disposed in the air-conditioning unit. Conveniently, however, a refrigerant circuit, in particular a compressor-driven refrigerant circuit, is omitted. In such a refrigerant circuit, usually a refrigerant is compressed by a compressor, emits heat via a condenser, is expanded via an expansion valve and takes in heat via an evaporator. The expenditure on equipment is large. By omitting such a refrigerant circuit with a compressor unit for air-conditioning the passenger compartment, a technically simplified construction is therefore overall achieved. Active cooling of the interior is preferably carried out exclusively by means of the thermomagnetic or thermoelectric module, provided that adequate passive cooling is not already possible, depending on the ambient temperature.

According to a preferred embodiment, the NT coolant circuit is assigned a dedicated, second ambient heat exchanger. Therefore, the thermal management system has its own ambient heat exchanger for purposes of heat exchange with the ambient air for each of the refrigerant circuits. This is particularly advantageous during electric operation if the first coolant is very hot. The separate cooling ability allows for a lower temperature level in the second coolant circuit to be set.

In a particularly expedient embodiment, a further temperature control is integrated into the NT coolant circuit, particularly in a seat. Preferably, this is another thermomagnetic or thermoelectric module. Integration into the second (NT) coolant circuit is in this case again understood to mean that the thermomagnetic or thermoelectric module is in heat-exchanging contact with the second coolant, or can be brought into heat-exchanging contact by means of a switching valve. The seat to be temperature controlled is therefore connected to the NT coolant circuit. Through integration into the NT coolant circuit, the efficiency of the thermoelectric module is improved in the cooling mode as well as in the heating mode. No additional seat warmer, formed by a resistance heating element, for example a so-called PTC element, is required and is in particular not formed. In addition, warming of the seat is possible and provided completely without the use of electrical energy, namely, if the heat retained in the NT coolant circuit is sufficient.

By creating this decentralized refrigeration and heat generation locally in a seat or in another component of the passenger compartment by means of the additional temperature control, the required thermal cooling or heating capacity is provided very locally and thus reduced to a minimum required degree, achieving overall high energy efficiency.

In a suitable development, a battery is further integrated or may at least be connected to the NT coolant circuit, which is used to supply electric power to the electric powertrain, in particular the driving motor. Such batteries are usually cooled during normal operation, so that they do not overheat. By integrating the battery in the NT coolant circuit, the cooling power of the temperature control device, for example, the thermoelectric module, is exploited when needed. This is particularly advantageous at high ambient temperatures. In principle, the low temperature level of the second coolant circuit is also available. At the same time, warming of the battery under cold ambient conditions is also possible.

In the event that not enough waste heat is available, a switchable, power or fuel-operated burner is additionally arranged. The fuel is, for example, fuel for the internal combustion engine in a hybrid vehicle. For a purely electric vehicle, a separate supply tank is disposed for the burner and (bio) ethanol, for example, is used as a fuel. Even at low outside temperatures and also in the event that there is not enough waste heat available from the electric drive components, in this way, the heating of the interior is provided without additional electrical energy consumption. An electrical resistance heater, in particular a PTC element, is preferably omitted.

While the two coolant circuits are preferably coupled to one another for a heating operation for purposes of heating the interior, they are generally separated and decoupled in a cooling mode. Via each coolant circuit, heat is released separately into the environment. The electrical components of the powertrain as well as the interior are therefore preferably cooled completely independently. A heat exchange between these two coolant circuits does not take place in the cooling mode.

The thermal management system allows for an overall very energy-efficient use for air-conditioning the interior and can be operated in different modes based on the current environmental and/or driving conditions and depending on the current air-conditioning needs of the vehicle occupants.

Thus, in a cooling mode—as already mentioned—the two coolant circuits are decoupled, in order to on the one hand cool the electrical components, and the interior, on the other. The temperature control device removes heat from the indoor air, i.e. the air that is passed through the air-conditioning unit, and/or from the other components in the interior (seats etc.) and dissipates the heat to the second coolant circuit. The two coolant circuits are cooled over the environment by the respective ambient heat exchanger.

According to a first heating mode in which only the interior is heated and the powertrain is cooled, the two coolant circuits are coupled to each other by means of a first switching valve. The waste heat available in the powertrain is wholly or partially fed to a heater core disposed in the air-conditioning unit. The heater core is arranged in the air-conditioning unit in addition to the actual temperature control device, so in addition to the thermomagnetic or thermoelectric module. This need not be supplied with electrical power in this case. Generally, heat is transferred from the first to the second coolant circuit in the first heating mode.

According to a second heating mode, the temperature control device is preferably switched on for heating. This means that it raises ambient heat or waste heat from the first coolant circuit to a higher temperature level in the manner of a heat pump. In this second heating mode, the heater core is preferably already connected to the first coolant circuit. The temperature control device thus plays a supporting role. Here, the advantage of emission-free heating is achieved, a connection of the burner is not necessary and does not take place in this second heating mode.

By contrast, in an alternative third heating mode, the burner is switched on to achieve range-neutral heating and the temperature control device is switched off. The heating energy is thus applied through the burner, preferably in addition to the waste heat of the powertrain.

In a preferred embodiment, a fourth heating mode is provided in which both the burner and the temperature control device are switched on for heating purposes. This serves to achieve a peak heating power and to optimally adjust the supply temperature of the air into the interior. This adjustment is hardly achievable or only with great effort with the sole use of the fuel-operated burner because of the only small flexibility of the combustion process. The parallel operation of both the burner and the temperature control device, especially during transient operation, as long as the burner has not yet reached its full capacity, has an advantageous effect on comfort and on the possible need to defrost at startup.

Preferably, furthermore a storage mode is formed, wherein at least one of the electrical components of the powertrain, in particular the battery, is utilized as thermal storage for the second coolant circuit, and to this end, the second coolant is in particular not fed through the ambient heat exchanger. The component of the powertrain is thereby integrated into the second NT coolant circuit. This configuration is based on the consideration that in particular the battery has a very high heat capacity, which can be exploited in an efficient manner depending on the current needs and circumstances. This serves both for heating and for cooling purposes. The Peltier modules achieve optimum efficiency at a low temperature difference between the two sides (hot/cold side). With a low waste heat production, under certain circumstances, a return temperature of the coolant for cooling the component of the powertrain may be more suitable than the flow of the second coolant in the second coolant circuit, recooled via the ambient heat exchanger. Preferably, the battery can only be connected to the NT coolant circuit. Alternatively, the return temperature of the first coolant of the HT coolant circuit is used for this storage mode, that is, the two coolant circuits are coupled to one another accordingly, in particular hydraulically.

Lastly, a preconditioning mode is formed in a preferred embodiment, during which, for example, the interior or a component of the electric powertrain is preheated prior to starting the motor vehicle. This is done either by means of the burner or, if necessary, by means of the temperature control device within the air-conditioning unit.

In the case of a hybrid vehicle, in which in addition to the electric powertrain, an internal combustion engine is also arranged, a further third coolant circuit is conveniently disposed for cooling the combustion engine, which is typically operated at an even higher temperature level in the normal operating state. Its maximum operating temperature typically lies at 110° to 130° C., higher than the maximum temperature in the first HT coolant circuit. As compared to the first HT coolant circuit, it also usually has a significantly higher maximum pressure level of, for example, 1-2 bar. To take advantage of the waste heat of the internal combustion engine, conveniently and optionally, a further heater core is disposed within the air-conditioning unit, which is integrated in this third coolant circuit, or a heat exchanger for heat transfer between the third and the first coolant circuit is provided. As an alternative to the arrangement of a third coolant circuit, it is also possible to integrate the internal combustion engine in the first HAT coolant circuit, provided that the cooling capacity is sufficient, for example, in a (small) internal combustion engine with less waste heat production.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
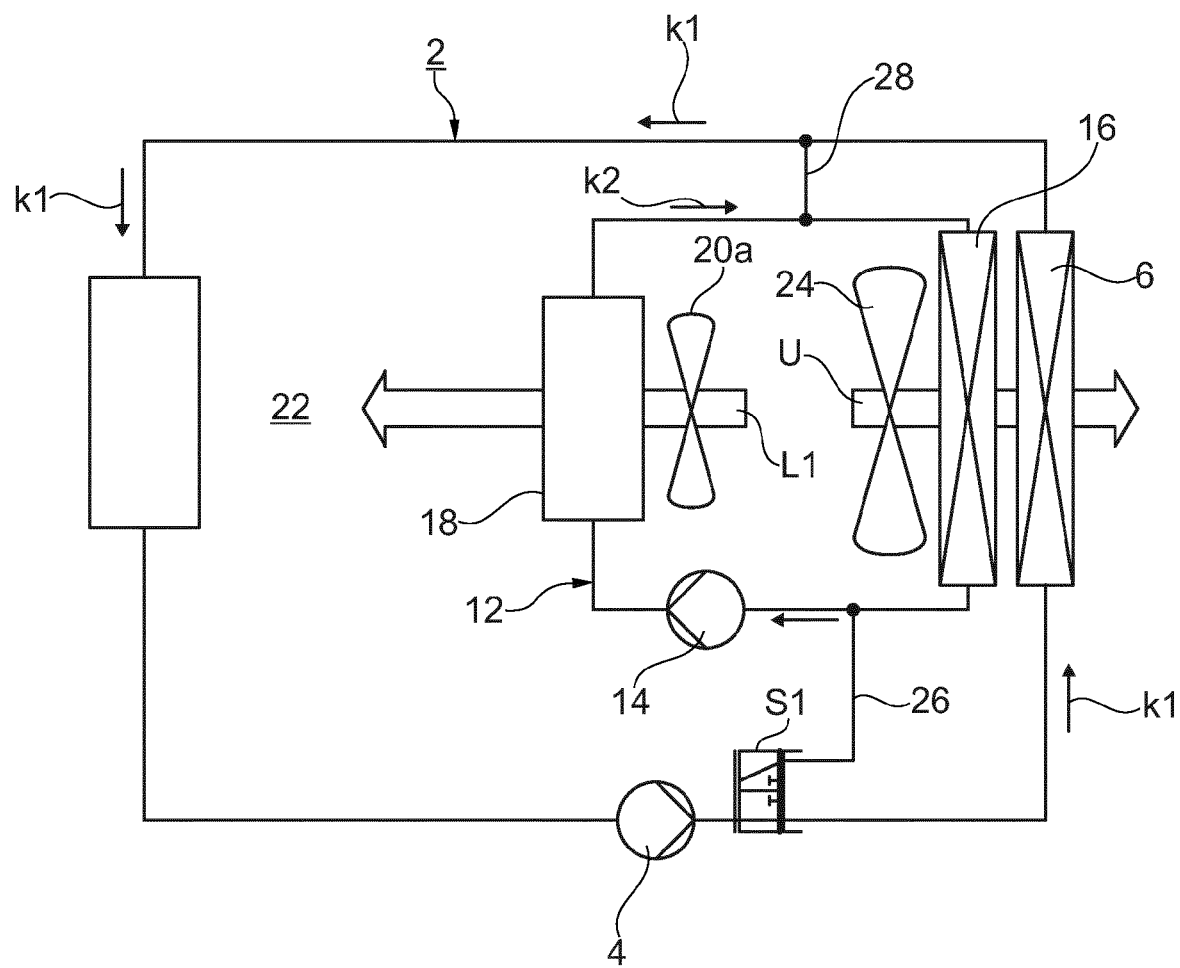
FIG. 1 is a basic structure of the thermal management system.

The basic structure of the thermal management system is explained in detail with reference to FIG. 1: The thermal management system comprises a first coolant circuit 2, in which a liquid first coolant K1 is cycled, as indicated by the arrows. The first coolant circuit is hereinafter referred to as HT coolant circuit 2. A first pump 4, a first ambient heat exchanger 6 and at least one component of an electric powertrain 8 to be cooled are integrated in the HT coolant circuit 2. The electric powertrain 8 thereby forms a heat source and the first ambient heat exchanger 6 is a heat sink.

The thermal management system additionally comprises a second coolant circuit 12, which is hereinafter referred to as NT cooling cycle 12. For better differentiation, the HT coolant circuit 2 is shown in the figures with a thicker line width. A second liquid coolant K2 is cycled in the NT coolant circuit 12. The second coolant circuit 12 for this purpose comprises a second pump 14, a second ambient heat exchanger 16 and an air-conditioning unit 18. An air stream to be conditioned L1 is guided through the air-conditioning unit 18 by means of a first cooling fan 20a, which is usually integrated in the air-conditioning unit 18, and is delivered to a passenger compartment 22.

The ambient heat exchangers 6,16 are also assigned at least one radiator fan 24 so that the ambient heat exchangers 6,16 are traversed by ambient air U. The ambient heat exchangers 6,16 are typically integrated in the front of a vehicle.

The two coolant circuits 2, 12 are connected to one another via a first switching valve S1, which in the embodiment is formed as a two-way valve. For this purpose, a first and second connecting strand 26, 28 are formed. The first connecting strand 26 thereby connects the first switching valve S1 with the second coolant circuit 12 and opens into it—seen in the flow direction of the second coolant K2—downstream of the second ambient heat exchanger 16 and upstream of the air-conditioning unit 18. The second connecting strand 28 connects the two coolant circuits 2, 12 downstream of the air-conditioning unit 18 and upstream of the second ambient heat exchanger 16.

When linking the two coolant circuits 2, 12, i.e., in a flow connection, the coolants K1, K2 materially intermix with one another. These are identical. Water provided with antifreeze is preferably used as a coolant.

Figure 2:
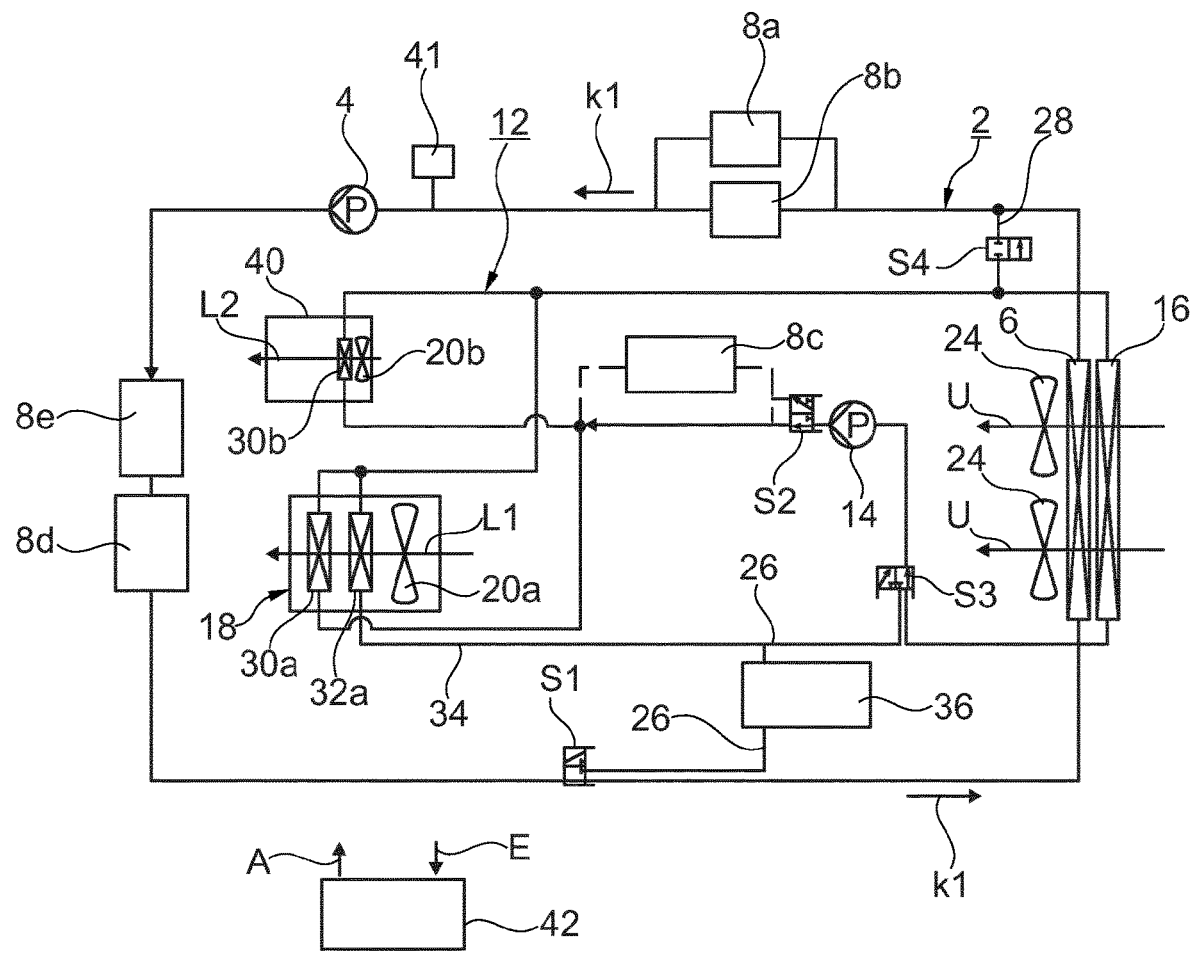
FIG. 2 is an exemplary embodiment of the thermal management system.

A preferred embodiment is shown in FIG. 2, by means of which the various operating modes will be explained below. In this embodiment, the electrical powertrain 8 comprises a plurality of components, namely, a charger 8a, a DC/DC converter 8b, a battery 8c, the actual electric traction motor 8d and power electronics 8e for controlling the traction motor 8d. Except for the battery 8c, all powertrain components 8 are integrated in the first coolant circuit 2 in the illustrated embodiment. In the exemplary embodiment, the battery 8c can be connected via a second switching valve S2 to the second coolant circuit 12, as shown by a broken line.

In the air-conditioning unit 18, a temperature control unit especially designed as a Peltier module 30a, a heater core 32 and the already mentioned first fan 20a are integrated. The heater core 32 is integrated in the exemplary embodiment on a bypass path 34 which branches off from the first connecting strand 26. After the heater core 32, this bypass path 34 opens into the second coolant circuit 12. A burner 36 is associated with this heater core 32, which is switched upstream of the heater core 32 to the bypass path 34 or—as shown in FIG. 2—in the first connecting strand 26 before the bypass path 34 branches off.

If necessary, the first connecting strand 26 is subsequently connectable to the burner 36 via a third switching valve S3 with the second coolant circuit 12. The third switching valve S3 is also formed in the embodiment as a two-way valve, the same as the first and second shift valves S1, S2. The two switching valves S1, S3 upstream and downstream of the burner 36 allow for the first coolant circuit 2 to be coupled in different ways with the second coolant circuit 12. The second connecting strand 28 can be switched on or off via a fourth switching valve S4.

In addition to the air-conditioning unit 18, a further temperature control device is integrated in an interior component, in particular in a seat 40. The further temperature control is selectively formed in the embodiment as a thermomagnetic and preferably as a further Peltier module 30b, which is integrated in the second coolant circuit 2. This module 30b is assigned a second fan 20b to air-condition a second air stream L2, which is for example used for air-conditioning of the seat. The fan 20b is particularly integrated into the seat.

Furthermore, a compensating container 41 is integrated in the first coolant circuit 2. Lastly, the thermal management system further comprises a control unit 42 which controls the entire thermal management system. To this end, the control unit 42 receives input signals E. These are, for example, status signals of the individual components of the thermal management system of their current state (e.g. "on", "off"), and in particular sensor signals, for example, of temperature sensors via which the respective current temperatures of the coolants K1, K2, preferably complementing an ambient temperature, also the temperatures of the air flow L1, L2 are detected. Furthermore, preferably the temperatures of the individual components 8a to 8e of the powertrain are detected. Finally, in particular the temperature of the interior 22 is detected, which is to be regulated to a desired value.

Depending on these incoming parameters, the control unit 42 controls the thermal management system by means of output signals A, and switches in particular between the operating modes described as follows:

For the different cooling and heating modes, in particular the state of the first temperature control device 30a is described below. The further temperature control device 30b can operate in an identical manner in each case and can be switched on when required. This is done in each case via enabling or disabling the further temperature control device 30b by an electrical/magnetic activation of the thermomagnetic or thermoelectric module and/or by integration in the NT coolant circuit 12. The output of the modules 30a, 30b can be influenced and suitably adjusted by the supply of the electrical power and/or by the coolant flow K2. To regulate the flow of coolant K2, the second pump 14 is suitably controlled, in particular its speed.

In a cooling mode, the two coolant circuits 2 are separated from each other. The shifting valves S1, S4 are closed. The two pumps 4, 14 are in operation, the two coolants K1, K2 are cycled, the Peltier module 30a and/or the further Peltier module 30b are activated, i.e., an electrical voltage is applied so that they generate a cooling effect. The heat on the hot side of the respective Peltier modules is absorbed by the second coolant K2 and output via the second ambient heat exchanger 16 to the environment. The first air stream L1 and, if necessary, also the second air stream L2, are passed through the fans 20a, 20b to the Peltier modules 30a, 30b and thereby cooled, and then flow into the interior 22 and serve for cooling of the seat 40.

In a first heating mode, the interior 22 is heated and the powertrain 8 is cooled. For this purpose, the two coolant circuits 2,12 are connected to one another. The switching valve S1 has to be in its second switching position, so that the first connecting strand 26 is connected to the first coolant circuit 2. A partial diversion of the coolant K1 is also possible. The switching valve S3 is in the position shown in FIG. 2 so that the coolant K1 is guided exclusively over the bypass path 34 and through the heater core 32, before it subsequently flows into the second coolant circuit 12 after passing through the heater core 32. The fourth switching valve S4 is opened so that the two coolant circuits 2, 12 are connected to each other via the second connecting strand 28. In this first heating mode, exclusively the waste heat from the powertrain 8 is used to heat the interior 22. The third switching valve S3 can also be converted, if necessary, so that the two temperature control devices 30a, 30b are flowed through by the warm coolant. In this way, heating in particular of the seat 40 is made possible without additional electrical energy.

In a second heating mode, heat from the environment is extracted for emission-free heating, in particular in addition to the waste heat from the powertrain, and raised to a higher temperature level via the Peltier modules 30a, 30b according to the heat pump principle, and fed to the interior 22 or the seat 40. Starting from the first heating mode described above, the second pump 14 is also switched on so that in addition, also the second coolant K2 is guided in the second circuit 12 via the second ambient heat exchanger 16. The coolant K2 thereby absorbs heat from the environment via the second ambient heat exchanger 16, thus heating the cold side of the respective Peltier module 30a, 30b.

In a third heating mode, the Peltier modules 30a, 30b are turned off for range-neutral heating, i.e., they do not consume any electrical energy. As an additional heat source, the burner 36 is turned on. Based on the first heating mode, only the burner is switched on. The states of the switching valves S1, S3, S4 are identical to the first heating mode.

To achieve the highest heating power, both the burner 36 and the Peltier modules 30a, 30b are switched on in a fourth heating mode, thus operating as heat pumps. Starting from the third heating mode—as in the second heating mode—the third switching valve S3 is switched over, the second pump 14 is activated, so that heat is transferred to the interior 22 both via the heater core 32 and via the Peltier module 30a.

In addition to achieving the highest heating capacities, this fourth heating mode also serves for the optimal adjusting of the temperature of the first air stream L1, particularly when starting the burner 36 when it has not yet reached its full capacity. Controlling the temperature of the first air stream L1 is significantly refined by the Peltier module 30a, as with it, a fine adjustment is possible, which is not achievable with the burners 36 that are difficult to control.

According to a storage mode, it is provided that the return pipe of the first coolant circuit 2 and/or the return of the battery 8c as a heat source (in the case of a heating mode) or as a heat sink (in the case of a cooling mode) is used in place of the second ambient heat exchanger 16. This occurs with low waste heat production of the powertrain 8. Utilizing the return coolant flow from the powertrain 8 is in this case often more suitable than using the coolant flow of the second coolant K2, recooled (or heated) via the second ambient heat exchanger 16. The basis for this is the fact that an optimum operating range of the Peltier modules 30a, 30b is achieved by a small temperature difference between the side to which the second refrigerant K2 is applied, also called the water side, and the opposite side, also known as the air side, of the Peltier module 30a, 30b. In this case, therefore, overall, a heat capacity of the powertrain is utilized as a heat source or as a heat sink. For this, in particular the battery 8c is suitable, which is already exclusively associated with the NT coolant circuit in the embodiment. In this mode of operation, the second coolant K2 is thus not particularly guided through the second ambient heat exchanger 16, but instead re-circulated through the first coolant circuit 2, i.e., via the powertrain 8.

Alternatively, in order to exploit the reflux temperature of the other components of the powertrain 8 arranged in the HT coolant circuit 2, the first and the third switching valve S1, S3 are switched over so that the recirculated coolant K1 can be brought via the first connecting strand 26 into the second coolant circuit 12 and via the second pump 14 through the Peltier module 30a. The switching valve S4 is also switched over so that the second ambient heat exchanger 16 is taken from the circulation and the coolant K2 is again returned to the first coolant circuit 2.

In a conditioning mode, the interior 22 and/or the battery 8c are preconditioned, i.e., especially heated, at low ambient temperatures, selectively or in combination, via the burner 36 or the Peltier module 30a. This conditioning mode corresponds to the second or third heating mode, as previously described, in the circuit diagram in FIG. 2.

Finally, a post-heating mode is also provided which corresponds to the second heating mode of emission-free heating in the circuit diagram of FIG. 2. The prerequisite for this post-heating mode is that minimum heating power of the burner 36 exceeds the required heating power, so that therefore a connection of the burner 36 would lead to excessive heat input. The desired (low) thermal heating power and thus the corresponding desired temperature of the first air stream L1 (injection temperature) is therefore achieved by the additionally connected Peltier module 30a with low electrical energy consumption.

The switching valves S1 to S4 are formed in the embodiment as switching or changeover valves. Alternatively, mixing valves are arranged, so that only partial streams are branched off. Such mixing valves are also preferably controlled such to be able to set, for example, a desired (mixed) temperature of the second coolant K2 in a coupling of the two coolant circuits 2, 12 in the NT coolant circuit 12. Such a mixing valve is preferably also arranged between the air-conditioning unit 18 and the further component, in particular the seat 40, to adjust a suitable temperature for the seat.

Figure 3:
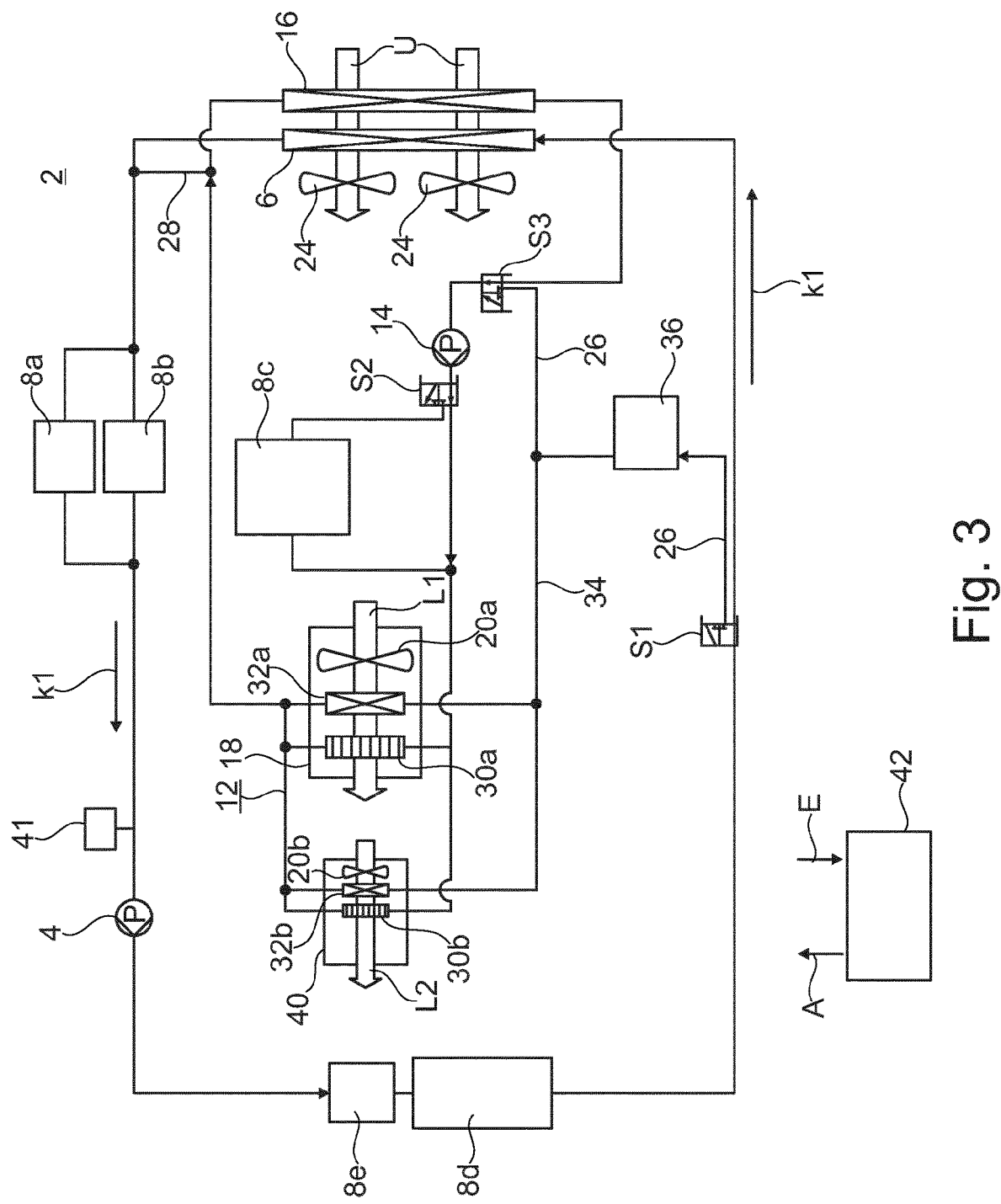
FIG. 3 is a modified embodiment.

FIG. 3 shows a slightly modified embodiment as compared to the embodiment in FIG. 2.

Hereinafter, in addition to the temperature control device 30b in the other component to be temperature-controlled, in particular in the seat 40, a further (additional) heater core 32b is integrated in the component, in particular in the seat 40. For the passive case where the Peltier module 30b is merely passed through by warm coolant, said heater core usually yields a better heat exchange performance than, for example, the Peltier module 30b. If, therefore, for example, heating is performed in a heating mode via the fuel-operated burner 36, the energy is used more efficiently.

The two Peltier modules 30a, 30b are—as in the variant of FIG. 2—arranged in parallel. The same applies for the two heater cores 32a, b. All three (four) components are arranged in parallel.

Furthermore, in contrast to the embodiment in FIG. 2, the valve S4 is omitted in the modified embodiment of FIG. 3. The functionalities are not or hardly restricted thereby.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A thermal management system for an electric or hybrid vehicle, the system comprising:
a first coolant circuit for a liquid first coolant for controlling a temperature of electrical components of an electric powertrain;
an air-conditioning unit for air-conditioning an interior of the vehicle, said air-conditioning unit comprising a first cooling fan, a heater core and a temperature control device, wherein, during operation, an air stream to be air-conditioned is guided through the air-conditioning unit via the first cooling fan and is released into the interior;
a second coolant circuit for a liquid second coolant for air-conditioning the interior, which is designed for a lower operating temperature than the first coolant circuit, wherein the second coolant circuit is operable independently of the first coolant circuit and each of the coolant circuits have a pump whereby, in the second coolant circuit, there are no electrical components of said electric powertrain;
said temperature control device as part of the air-conditioning unit is integrated in the second coolant circuit for controlling the temperature of the interior and for temperature control operates in the manner of a heat pump, the temperature control device comprising a thermomagnetic or a thermoelectric module, whereby the temperature control device is disposed within said air stream which is guided through the air-conditioning unit and is released into the interior, the first and the second coolant circuits being coupled to one another; and
said heater core disposed in the air-conditioning unit, which is selectively connected for a first heating mode by being selectively connected to the first coolant circuit via a first switching valve so that both coolant circuits are coupled to one another such that the first and second coolant intermix with one another and heat is transferred from the first coolant circuit to the second coolant circuit,
wherein, in a cooling mode, both coolant circuits are decoupled and respectively emit heat into the environment, and
wherein, in the cooling mode, heat of the temperature control device is absorbed by the second coolant and released via an ambient temperature heat exchanger to the environment and heat of said electrical components is absorbed by the first coolant and released to the environment.

2. The thermal management system according to claim 1, wherein the thermal management system is, for air-conditioning the interior, free of a refrigerant circuit with a compressor unit and active cooling of the interior is carried out exclusively by means of the thermomagnetic or thermoelectric module.

3. The thermal management system according to claim 1, wherein the first coolant circuit is associated with a first ambient heat exchanger and the second coolant circuit is associated with a second ambient heat exchanger.

4. The thermal management system according to claim 1, wherein, for controlling the temperature of a battery, the battery is integratable in the second coolant circuit.

5. The thermal management system according to claim 1, wherein, in a storage mode, at least one of the electrical components of the electric powertrain or a battery is exploited as thermal storage for the second cooling circuit, and the second coolant is not guided through the ambient heat exchanger.

6. The thermal management system according to claim 1, wherein a preconditioning mode is provided, during which time before starting the vehicle, the interior or a component of the electric powertrain is preheated.

7. The thermal management system of claim 1, wherein, in the second coolant circuit, a further temperature control device is integrated in a seat for controlling the temperature of the seat and has a further thermomagnetic or thermoelectric module and is not a PTC element.

8. The thermal management system of claim 1, further comprising a burner associated with the heater core,
wherein the first cooling fan and the temperature control device are integrated in the air-conditioning unit, and
wherein the heater core is integrated in a bypass line from the second coolant circuit.

9. The thermal management system according to claim 1, wherein a switchable burner is arranged in the system.

10. The thermal management system according to claim 9, wherein for a second heating mode, the temperature control device is switched on for heating.

11. The thermal management system according to claim 10, wherein for a third heating mode, the switchable burner is switched on and the temperature control device is switched off.

12. The thermal management system according to claim 11, wherein at a high heat demand in a fourth heating mode, both the switchable burner and the temperature control device are switched on.

* * * * *